July 31, 1951  F. R. RIZER  2,562,740
ILLUMINATING DEVICE FOR AUTOMOBILE LICENSE PLATES
Filed March 13, 1948  2 Sheets-Sheet 2
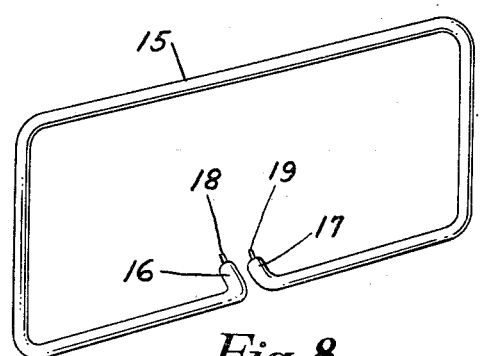
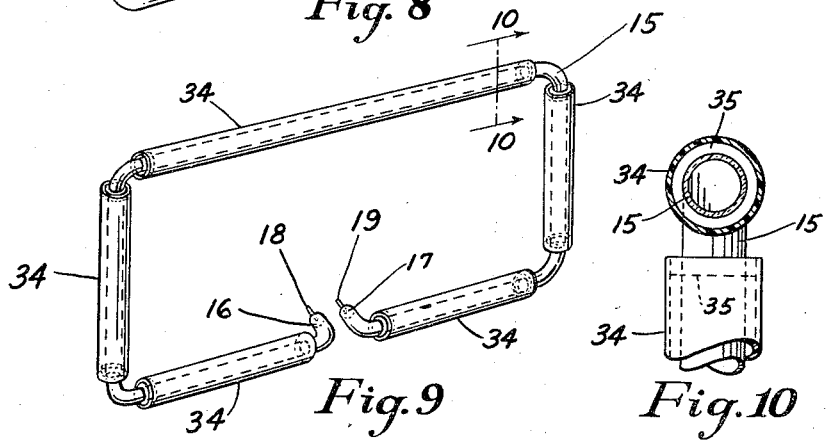
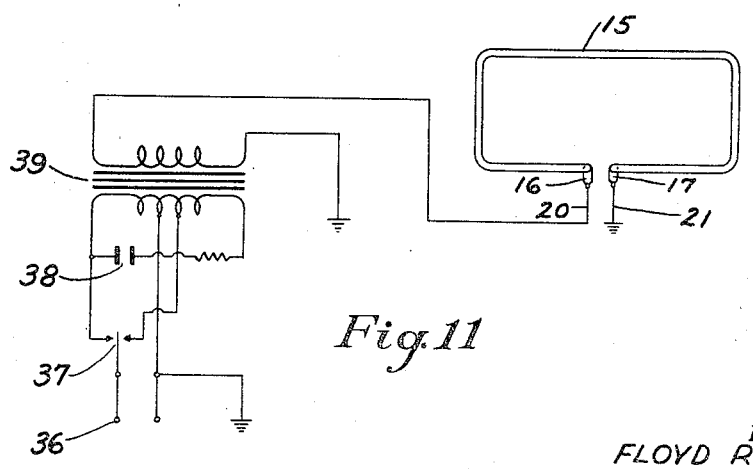
INVENTOR.
FLOYD R. RIZER
BY Edward M. Apple
ATTORNEY Patented July 31, 1951

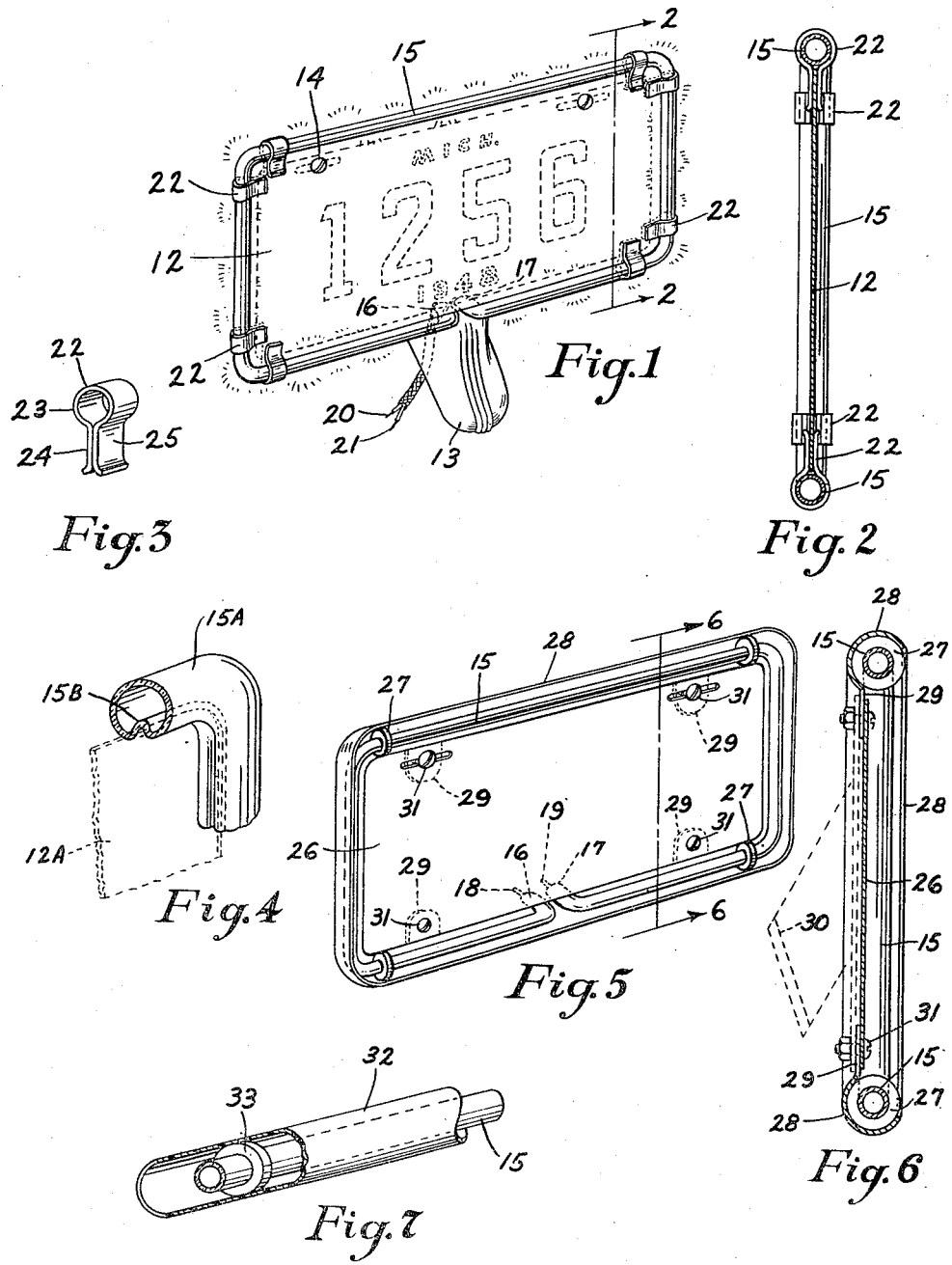

2,562,740

UNITED STATES PATENT OFFICE 2,562,740

ILLUMINATING DEVICE FOR AUTOMOBILE LICENSE PLATES

Floyd R. Rizer, Detroit, Mich., assignor to Charles E. Rose, Detroit, Mich.

Application March 13, 1948, Serial No. 14,768

1 Claim. (Cl. 40—130)

This invention relates to automobile accessories, and has particular reference to a device for thoroughly and completely illuminating the license plate.

An object of the invention is to provide a tubular illuminating element which completely encircles the periphery of the license plate, whereby all portions of the plate are uniformly illuminated.

Another object of the invention is to provide an illuminating medium for an automobile license plate, which will eliminate blind spots on the license plate, whereby the subject matter thereon may be more easily read by peace officers and others as the car speeds through the darkness.

Another object of the invention is the provision of a tubular lighting element for an automobile license plate which is adapted to be supported by means cooperating with the license plate.

Another object of the invention is the provision of a fluorescent illuminating device for an automobile license plate which is provided with means for protecting it against ordinary breakage.

Another object of the invention is the provision of a fluorescent illuminating device for an automobile license plate which is adapted to be energized by current from the automobile storage battery.

Another object of the invention is the provision of a device of the character indicated, which is constructed and arranged so that the maximum amount of illumination derived therefrom may be directed to the exposed face of the license plate.

The foregoing and other objects and advantages of the invention will become more apparent as the description proceeds, reference being made from time to time to the accompanying drawings, forming part of the within disclosure, in which drawings:

Fig. 1 is a perspective view of a conventional automobile license plate to which is secured one form of the device embodying the invention.

Fig. 2 is a section taken substantially on the line 2—2 of Fig. 1.

Fig. 3 is an enlarged perspective view of one of the spring clips used to mount the tube to the license plate.

Fig. 4 is an enlarged fragmentary detail of a modified form of the illuminating tube.

Fig. 5 is a modified form of the device in which the tube is mounted on the interior of a reflector element which is adapted to be secured to the license plate.

Fig. 6 is a section taken substantially on the line 6—6 of Fig. 5.

Fig. 7 is a fragmentary detail of a modified form of the tube with a flexible plastic protective housing on the exterior thereof.

Fig. 8 is a perspective view of the fluorescent tube employed with the device.

Fig. 9 is a perspective view of the tube illustrated in Fig. 8 with lengths of plastic tubing mounted thereon with resilient washers, or spacers, therebetween.

Fig. 10 is a section taken substantially on the line 10—10 of Fig. 9.

Fig. 11 is a diagrammatic view of the electrical circuit employed with the device.

Referring now more particularly to the drawings, it will be understood that in the embodiment herein disclosed, the reference character 12 indicates a conventional automobile license plate which is adapted to be supported on an automobile by a conventional bracket 13 to which the license plate is secured by means of bolts or screws 14 as in the conventional manner. Mounted about the outer periphery of the license plate 12 is a fluorescent tube 15 which has terminal ends 16 and 17 in which are mounted electrical conductors 18 and 19 which in turn are connected to the wires 20 and 21, which comprise part of the electrical circuit shown in Fig. 11.

The fluorescent tube 15 is secured to the license plate 12 by means of a plurality of spring clips 22, the construction of which is more clearly illustrated in Fig. 3. The spring clips 22 (Fig. 3) have a circular portion 23 adapted to encompass the tube 15 and a pair of spring legs 24 and 25, which are adapted to frictionally engage the front and back faces respectively of the license plate 12.

The spring legs 24 and 25 are of such length that when they are positioned on the license plate 12, they also serve as spacers between the plate 12 and the tube 15. Although I have shown in Fig. 1 the simplest form of the invention, it will be understood that certain modifications of the invention may be made, all of which are intended to be within the scope of the appended claims. For example, in Fig. 4 I show a modified form of tube 15A which is constructed with an inside peripheral groove 15B, which is adapted to engage the outer periphery of the license plate 12A.

In Fig. 5 I show another modification in which the license plate 26 is mounted as previously described. In this embodiment, however, the tube 15 is secured by means of rubber spacers 27 to the inside of a metal reflector 28 which is provided with ears 29 whereby the reflector 28 is secured to the license plate 26 and its supporting bracket 30 by the conventional bolts or screws 21. In this embodiment the member 28 serves not only as a reflector, but as means to support the tube 15, and means for attaching the tube to the license plate 26.

In Fig. 7 I illustrate an enlarged fragmentary detail of a modified form of the invention in which the tube 15 is covered by means of a flexible plastic tubing 32 which is held in spaced relation therewith by means of resilient spacers 33. In this embodiment the flexible plastic tubing 32 serves as a protector for the illuminating tube 15.

In Fig. 9 I show another modification in which the tube 15 may be protected by several lengths of rigid plastic tubing 34 which are again held in spaced relation by means of resilient spacers 35.

In Fig. 11 I diagrammatically illustrate a circuit which may be employed with the illuminating device hereinabove described, in which circuit the reference character 36 indicates a source of direct current such as from a storage battery of the automobile ignition system, 37 indicates a reflector for changing direct to alternating current, 38 indicates a conventional condenser, and 39 indicates a transformer for stepping up the alternating current to the voltage required for the fluorescent tube 15.

Having described my invention, what I claim and desire to secure by Letters Patent is:

In a device of the character described in combination an automobile license plate, an illuminating tubular member in substantially the same plane with and surrounding a substantial portion of the periphery of said license plate, means for securing said tubular member to said license plate, said last named means comprising a plurality of spring clips each having a circular portion adapted to engage the tubular member and spring legs adapted to frictionally engage opposite faces of said license plate, and means to attach the license plate to a vehicle body.

FLOYD R. RIZER.

REFERENCES CITED

The following references are of record in the file of this patent:

UNITED STATES PATENTS

| Number | Name | Date |
|---|---|---|
| 1,615,449 | Fullerton | Jan. 25, 1927 |
| 1,664,302 | Leopold et al. | Mar. 27, 1928 |
| 1,739,709 | Chiapetto | Dec. 17, 1929 |
| 1,816,741 | Orester et al. | July 28, 1931 |
| 1,850,319 | Fensom et al. | Mar. 22, 1932 |
| 1,906,309 | Boyce et al. | May 2, 1933 |
| 1,931,742 | Scharringhausen | Oct. 24, 1933 |
| 1,937,957 | Hotchner | Dec. 5, 1933 |
| 2,146,806 | Epstein | Feb. 14, 1939 |

FOREIGN PATENTS

| Number | Country | Date |
|---|---|---|
| 401,151 | Great Britain | Nov. 9, 1933 |
| 408,429 | Great Britain | Apr. 12, 1934 |